May 2, 1950          G. U. OLSSON          2,506,276
REGULATING TRANSFORMER
Filed Feb. 21, 1948
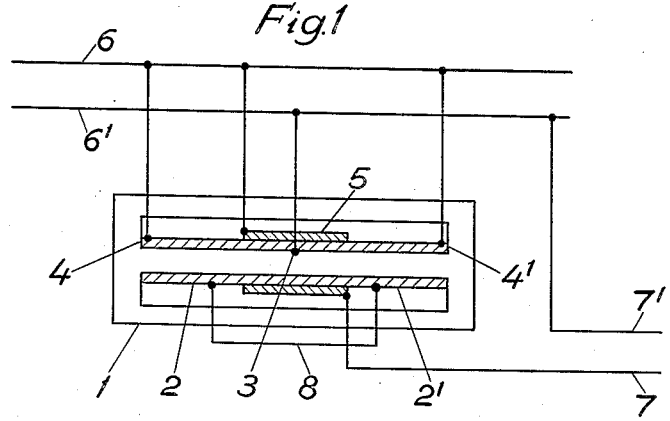
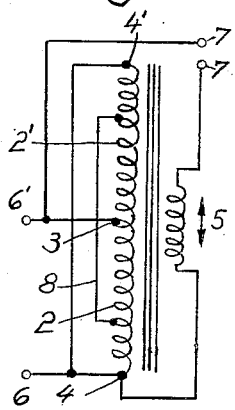
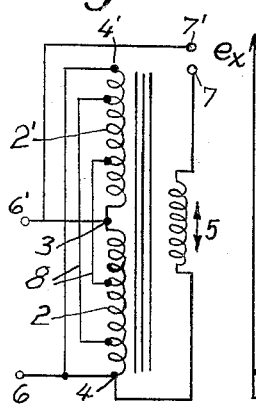
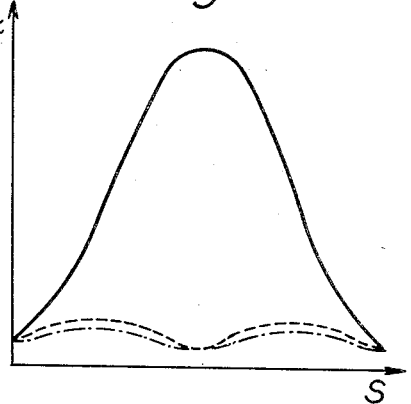
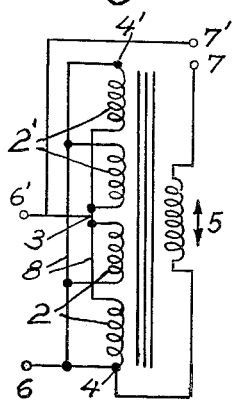
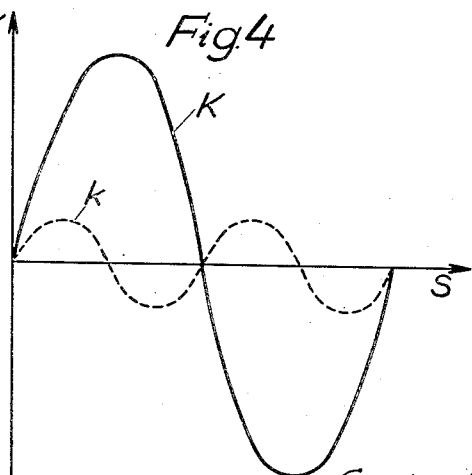
Inventor
Gustav Uno Olsson
By Eames Aiken
Attorney.

Patented May 2, 1950

2,506,276

UNITED STATES PATENT OFFICE 2,506,276

REGULATING TRANSFORMER

Gustav Uno Olsson, Ludvika, Sweden, assignor to Allmanna Svenska Elektriska Aktiebolaget, Vasteras, Sweden, a Swedish corporation Application February 21, 1948, Serial No. 10,019
In Sweden December 7, 1940

Section 1, Public Law 690, August 8, 1946
Patent expires December 7, 1960

3 Claims. (Cl. 323—44)

The present invention has for its object a regulating transformer in which an additional voltage is generated in a coil movable in two opposing fields. This additional voltage can either be added to the network voltage itself or to a main voltage generated in a separate transformer or transformer winding. In such regulating transformers generally an exactly continuous voltage regulation is achieved, and the additional voltage will vary from a negative to a positive value according to the position of the movable coil with respect to the two opposing fields.

Such regulating transformers, however, have the disadvantage that the parts of the fields from the primary coil, which do not traverse the movable coil, give rise to considerable inductive voltage drops. According to the present invention, such inductive voltage drops are practically avoided in that points with the same potential on the two parts of the primary winding, which cause the two opposing fields, are in pairs directly connected with each other. The two opposing parts of the primary winding may be divided into a plurality of parallel connected coils. In this case the connections between equipotential points are formed by the connections joining the coils. In most cases it is sufficient to arrange only one such connection between the midpoints of the two opposing parts of the primary winding. These equipotential connections act so that when the movable coil is in such a position that only a part of the field from the two parts of the primary winding traverses it the current through the moving coil will give rise to an equalisation current through the parts of the primary winding surrounded by the movable coil and through the equipotential connections. By this the current through the parts of the primary winding, which are not surrounded by the movable coil, is highly reduced, and by this also the leakage fields and thus the inductive voltage drop of the regulating transformer.

The equipotential connections will also give the great advantage that the mechanical short-circuit forces on the movable coil are highly reduced.

A calculation will show that the provision of only one equipotential connection reduces the axial short-circuit forces down to ⅙ and the inductive voltage drop of the regulating transformer will by the provision of one such equipotential connection be reduced to 1/10. In spite of the fact that by provision of several equipotential connections the voltage drop and also the axial short-circuit forces can be further reduced, the provision of only one equipotential connection gives so large a reduction of the said magnitudes that it is sufficient for practical purposes.

On the accompanying drawing, arrangements according to the present invention are shown by way of example.

Referring to the drawing:

Fig. 1 is a cross-sectional view of a construction of a voltage regulator transformer according to the invention. Fig. 1a is an electrical diagram indicating the connections of the coils of the transformer according to Fig. 1.

Fig. 2a and Fig. 2b, respectively, are electrical diagrams indicating embodiments of the invention in modified arrangements, wherein Fig. 2a shows equipotential points of two winding parts connected in pairs with each other, and Fig. 2b shows winding parts connected in parallel.

Figure 3 is a curve, which shows the variation of the voltage drop as a function of the position of the movable coil with respect to the two opposing fields, the full curve showing the voltage drop, if there is no equipotential connection, the dashed curve showing the voltage drop in the case where only one equipotential connection is provided, and the dash and dotted curve showing the voltage drop in the case of the provision of an infinite number of equipotential connections.

In Figure 4, the full curve shows the variation of the axial short-circuit force as a function of the position of the coil with respect to the two fields, if there is no equipotential connection, and the dotted curve shows the same force if only one equipotential connection is provided.

In Figure 1, 1 designates a three-legged transformer core, the middle leg of which is surrounded by a primary winding 2, $2^1$, the ends of which 4 and $4^1$ are connected to one of the phases 6 of the network, whereas the midpoint of the winding is connected to another phase $6^1$ of the network. The movable coil 5 is arranged around the primary winding and is connected at one end to the phase 6. The regulated voltage is taken out between the conductor 7 on the other end of the coil 5 and the conductor $7^1$ connected to the phase $6^1$.

As the midpoint 3 of the winding 2, $2^1$ is connected to one phase and the two end points of the winding to the other phase, it is clear that the currents in the two winding parts 2 and $2^1$ will have such a direction that the fields in the middle leg of the transformer core will have opposite directions. At the outer ends these fields will be closed through the yoke of the transformer core, whereas the ends of the field which meet at the middle of the middle leg, will traverse over from the middle leg to the outer legs. When the coil 5 is in the end position to the left, it will be traversed only by the field from the winding part 2, and when it is in the end position to the right, it will be traversed only by the field from the winding part 2¹. In the former case, the highest additional voltage in one direction is induced in the coil 5, and in the other case the highest additional voltage in the other direction. The ratio between the windings 2, 2¹ and 5 can be given any arbitrary value and if the ratio is chosen so that the highest induced additional voltage, a continuous regulation of the voltage of the coil 5 is equal to the network voltage, a continuous regulation of the voltage between the conductors 7 and 7¹ from zero to double the network voltage is achieved when the coil 5 is moved from the left to the right. The coil 5 is suitably given a length equal to the half length of the middle leg. The middle points of the two winding parts 2 and 2¹ are connected by means of an equipotential connection 8, and it is clear that in the case where the coil 5 is in the middle position the current traversing the coil 5 produces a current through the inner parts of the winding parts 2 and 2¹ and through the equipotential connection 8. Through the outer parts of the winding parts 2 and 2¹, there will, however, not be any current or only a small one due to the large reactive resistance in these winding parts caused by the leakage fields.

Fig. 2a shows a modified arrangement, wherein the primary winding is divided into two parts 2 and 2¹, which parts generate two opposite fields in the transformer core, shown in Fig. 1, equipotential points being connected with each other in pairs by means of the connections 8.

Finally, Fig. 2b shows a modification wherein the two winding parts 2 and 2¹ are subdivided into two further parts. the terminals of which are connected in parallel in such a manner that opposite fields in the iron core are obtained.

In the diagram shown in Figure 3, S designates the position of the movable coil 5 and $e_x$ the inductive voltage drop of the regulating transformer. The full curve shows the voltage drop in the case where there is no equipotential connection 8, and the dashed curve shows the voltage drop, in the case where there is only one equipotential connection between the winding parts 2 and 2¹, while the dash and dotted curve shows the voltage drop under the supposition that an infinite number of equipotential connections are arranged between the winding parts 2 and 2¹.

In Figure 4, the full curve K shows the axial short-circuit force which acts on the movable coil 5 at different positions. The dashed curve $k$ shows the axial short-circuit force for different positions of coil 5 in the case where there is only one equipotential connection between the two winding parts 2 and 2¹.

As seen from Figure 3, a very considerable decrease of the inductive voltage drop of the regulating transformer is achieved by the provision of the equipotential connection 8, and further it is clear from Figure 4 that also the short-circuit forces are reduced in a high degree.

I claim as my invention:

1. An arrangement in voltage regulating transformers having a primary winding consisting of parts generating two opposing fields in the transformer core and having an additional winding axially movable on said primary winding for changing the voltage ratio, characterized in that the parts of the primary winding are connected with each other in equipotential points thus establishing closed circuits magnetically closely associated with said movable winding when the latter is in its mid position.

2. An arrangement according to claim 1, characterized in that the primary winding is divided into two parts which parts generate two opposing fields in the transformer core, equipotential points of the two winding parts being connected with each other in pairs.

3. An arrangement according to claim 1, characterized in that the parts causing said opposing fields are each subdivided into a plurality of parallel connected coils.

GUSTAV UNO OLSSON.

REFERENCES CITED

The following references are of record in the file of this patent:

UNITED STATES PATENTS

| Number | Name | Date |
| --- | --- | --- |
| 1,901,768 | Norris | Mar. 14, 1933 |
| 2,030,606 | Norris | Feb. 11, 1936 |